United States Patent
Berg

[11] 3,908,074
[45] Sept. 23, 1975

[54] JUNCTION BOX BACK AND SUPPORT
[76] Inventor: William R. Berg, 1616 S.E. Sixth St., Deerfield Beach, Fla. 33441
[22] Filed: Nov. 27, 1974
[21] Appl. No.: 527,849

[52] U.S. Cl. .................. 174/58; 174/48; 220/3.9; 248/DIG. 6; 248/205 R; 248/27
[51] Int. Cl.² ................................ H02G 3/08
[58] Field of Search .......... 174/58, 53, 48; 220/3.9, 220/3.92; 248/27, 205 R, 205 A, DIG. 6

[56] References Cited
UNITED STATES PATENTS
| | | | |
|---|---|---|---|
| 2,512,188 | 6/1950 | Wait et al. | 220/3.9 X |
| 3,701,448 | 10/1972 | Vadnais | 220/3.9 |
| 3,767,151 | 10/1973 | Seal et al. | 248/DIG. 6 X |

*Primary Examiner*—Darrell L. Clay
*Attorney, Agent, or Firm*—Malin & Haley

[57] ABSTRACT

A device for supporting and stabilizing an electrical outlet junction box comprising a unitary styrofoam supporting block having an indented channel disposed along one lateral face, an adhesive means for attaching the styrofoam block to the junction box back and a supporting bar adhesively attached to the junction box and disposed through the styrofoam block channel, the bar acting to laterally support the junction box between supporting wall studs. The device is coupled to the junction box when the box is mounted in a wall by adhesively attaching the pre-cut styrofoam block so that the junction box is supported by the styrofoam block to the adjacent back wall portion while the lateral support bar is cut and sized to rigidly support the junction box laterally between the wall studs.

2 Claims, 4 Drawing Figures

US Patent  Sept. 23, 1975  3,908,074
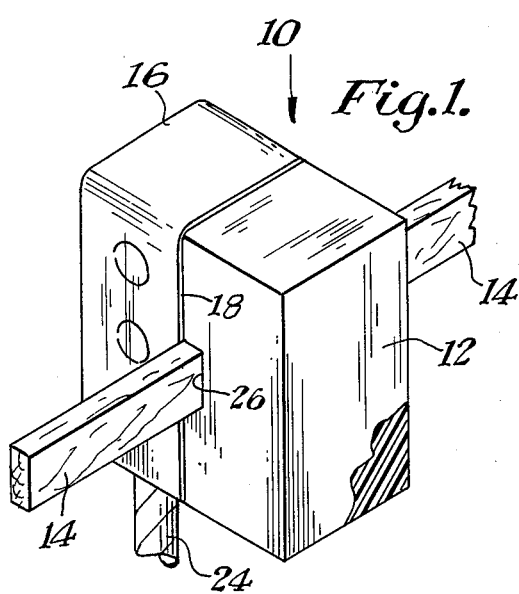
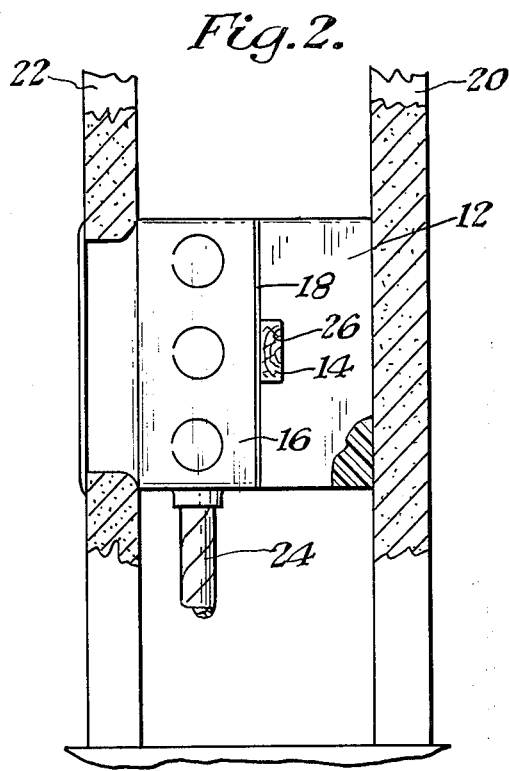
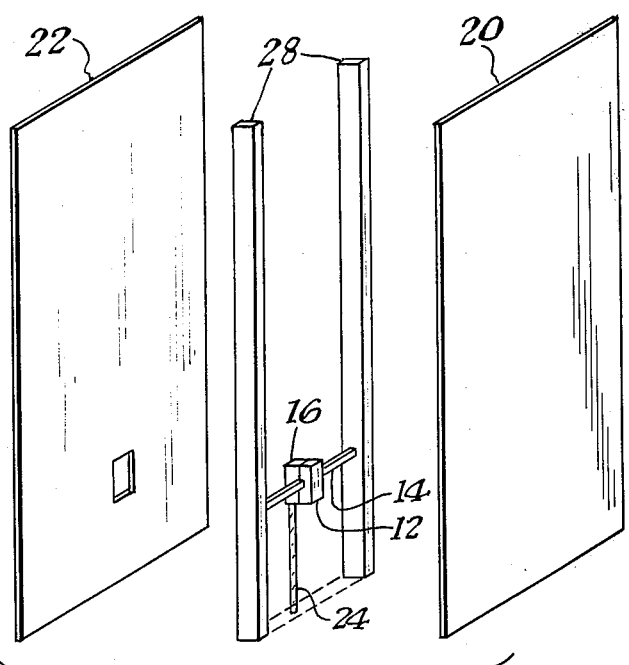
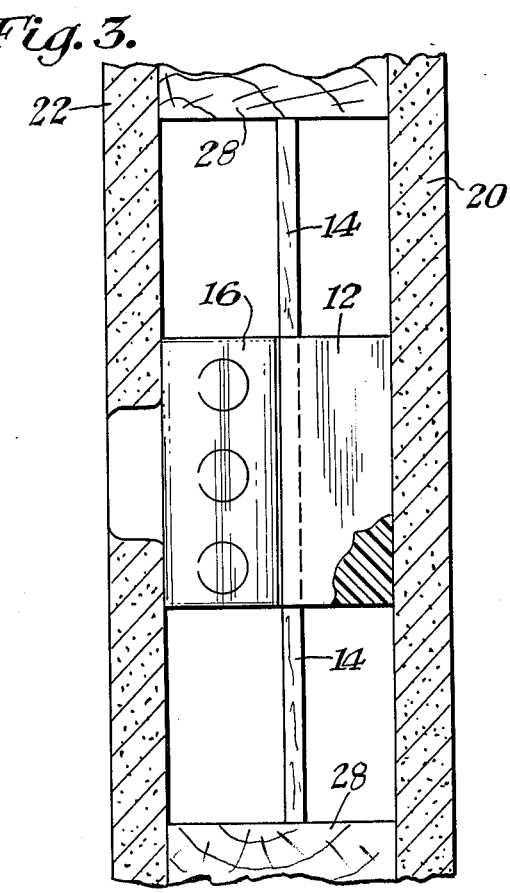

JUNCTION BOX BACK AND SUPPORT

BACKGROUND OF THE INVENTION

This invention relates generally to a device for supporting an electrical outlet junction box which is disposed within the wall surfaces of a building, and specifically to an attachable junction box wall support which is easily and readily fixed to a junction box for mounting the box during the wall construction.

In recent years, the cost of building construction has increased greatly, which is in part due to the high cost of labor. When an electrician installs a junction box he oftentimes must be involved in mounting the junction box within the dry wall structure to give it proper support between the walls. In the past, this has been a time consuming job because various strips and pieces of wood have been utilized to properly mount the box, requiring additional construction time which is unproductive time for an electrician. The instant invention reduces the construction time for installing a junction box because it provides a pre-cut, sized device which is quickly attached to the junction box for providing rigid and stable junction box installation. The instant invention reduces the labor time and the cost of construction immensely when considering the number of junction boxes installed.

BRIEF DESCRIPTION OF THE INVENTION

An electrical outlet junction box supporting device comprising a plastic block, said block having a grooved portion laterally disposed along one face, an adhesive means, a lateral support bar disposed within said block lateral groove, said adhesive means coupling said bar and said block to the back outside wall of said junction box whereby the lateral supporting bar is cut and connected between adjacent wall studs and the plastic block engages the inside wall surface opposite the box. Thus, when used with a conventional electrical outlet box, the box is supported in all three directions with the standard inlet conduit to the box providing a vertical support, the block and supporting bar providing transverse and lateral supports within the wall structure. The adhesive is pre-applied to one side of the block and may be covered until ready for use by a peel-off backing.

It is an object of this invention to provide an improved electrical junction box supporting device.

And yet another object of this invention is to provide a junction box support which may be easily and quickly installed, reducing construction time and cost.

But still yet another object of this invention is to provide a junction box support which is easily fabricated and provides a rigid, easily installed support structure.

In accordance with these and other objects which will be apparent hereinafter, the instant invention will now be described with particular reference to the accompanying drawings.

BRIEF DESCRIPTION OF THE DRAWINGS

FIG. 1 shows a perspective view of the instant invention.

FIG. 2 shows a side elevational view partially in cross-section of the instant invention.

FIG. 3 shows a top, plan view partially in cross-section of the instant invention.

FIG. 4 shows an exploded view of the instant invention as it would be installed between a pair of dry walls.

PREFERRED EMBODIMENT OF THE INVENTION

Referring now to the drawings, specifically FIG. 1, the instant invention is shown generally at 10 comprising a substantially rectangular plastic block 12 which may be constructed of a styrofoam material or the like, having a transverse groove 26 along one face of block 12. The block is coupled to the back outside wall of a conventional electrical junction outlet box 16 by a suitable adhesive 18. The adhesive may be pre-applied to one surface of block 12 and includes a peel-off covering which is removed when the block is installed. Laterally disposed within the groove 26 is a lateral support bar 14 which is connected at each end between adjacent wall studs to provide sufficient lateral support for the junction box. The supporting bar 14 is likewise connected along one side to the junction box outside back wall by a pre-applied adhesive. The supporting bar 14 may be of any material and preferably will be made of a lightweight, plastic material of a thickness for easy cutting with hand pliers or the like. The junction box 16 is conventional and is shown with a conduit 24 which leads to the junction box 16, acting to provide some vertical support for the junction box.

FIG. 2 shows the supporting device of the instant invention as installed between a pair of dry walls 20 and 22 with the wall 22 selected as having an opening for the junction box 16. The wall 20 is a conventional plaster board or dry wall which is found and utilized in the construction of dwellings, buildings or the like. The supporting block 12 has been pre-cut in depth or thickness so that the back of the outlet box 16 and the supporting block are firmly supported between the walls 20 and 22. The blocks may be made of standard thickness (one or two inches thick) allowing for the combining of blocks if necessitated by wall thickness.

FIG. 3 shows the junction box 16 positioned as it would be between dry walls 20 and 22 with the lateral supporting bar 14 coupled between a conventional pair of wall studs 28, the bar 14 being cut so that its ends are held between the studs themselves. The support block 12 rests adjacent dry wall 20 while the other side is adhesively coupled to the back wall of the junction box. Thus any force on the junction box toward the inside of the wall will be received and supported by the support block 12 while lateral forces will be received on the lateral support bar 14.

FIG. 4 shows the device as actually supported between wall studs 28 by the lateral support bars 14 which is adhesively coupled to the junction box 16 as is the back supporting block 12 as they would be disposed between dry walls 20 and 22.

The supporting block, which is shown of styrofoam, is pre-cut to particular sizes for standard or conventional wall sizes. Likewise, the lateral supporting bars may be constructed in standard lengths (conventional distance between studs) or may come in predetermined lengths which can be cut to a length as desired. The block may be constructed of any lightweight, electrical insulating type material while the lateral supporting bars may be constructed of a lightweight plastic or similar material.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device supporting an electrical outlet junction box within a walled enclosure comprising:

lightweight supporting block means, said block having a groove disposed along one surface;

an adhesive means disposed on the face having said groove coupling said block to the back of said junction outlet box.

2. A device, as in claim 1, including: a supporting bar disposed within said groove and adhesively connected to said junction box, said bar adapted to be disposed between a pair of wall studs.

* * * * *